Patented Jan. 10, 1928.

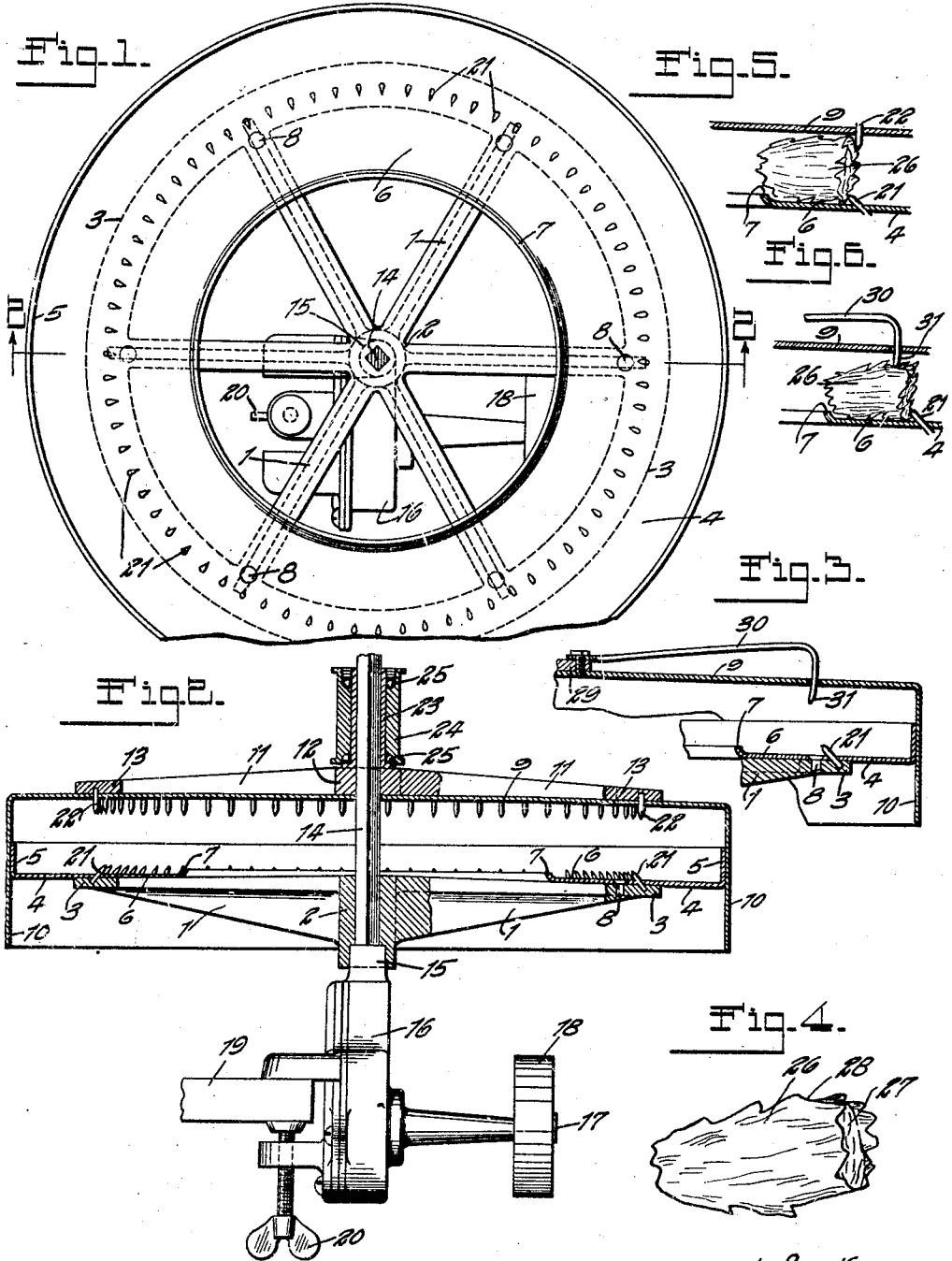

1,655,582

UNITED STATES PATENT OFFICE.

KARL D. UMRATH, OF ST. LOUIS, MISSOURI.

METHOD AND APPARATUS FOR SHELLING CRUSTACEA.

Application filed November 14, 1924. Serial No. 749,882.

This invention relates to the shelling of Crustacea and more particularly to a method and apparatus for separating the meat from the legs and claws thereof.

The separation of the meat from the body of Crustacea is not difficult for when the back shell and appendages are removed and the body divided on a line transversely of the lobes, the meaty portions can not only be thrown from the shell cells by centrifugal force but the shell can be retained by a grating through which the meaty portions may readily pass.

With the appendages, however, the conditions are different. The shell of the appendage is not only difficult to crack, but the meat is retained rather firmly therein. It is moreover desirable to take out the meat whole, but since it is rather hard it does not readily pass through a grating and even so it is liable to become mutilated and spoil the desired whole condition of the meat. Accordingly the procedure possible with the body of Crustacea can not be followed in the separation of the meat from the appendages. This is especially true of large crabs, such as king crabs or taraba crabs which is a species caught only in the cold current along the northern coast of Japan and also along the Siberian coast. This species has long legs and the size is frequently from three to four feet, of which the body is a very small part.

One of the objects of this invention, therefore, is to provide a method and apparatus whereby the meat may be rapidly and efficiently separated from the shell of the legs and claws of Crustacea.

Another object of this invention is to provide means whereby such separation may be obtained without tearing and shredding the meat portions but leave them substantially whole.

Further objects will appear from the detailed description taken in connection with the accompanying drawing, in which:

Figure 1 is a plan view of an apparatus adapted for carrying out this process and embodying this invention;

Figure 2 is a section on line 2—2, Figure 1;

Figure 3 is a detail section similar to Figure 2, but showing another embodiment of this invention;

Figure 4 is a perspective view of one of the leg portions;

Figure 5 is a detail showing the method of holding the shell in the embodiments shown in Figures 1 and 2; and Figure 6 is a view similar to Figure 5, but showing the method of holding the shell in the embodiment shown in Figure 3.

In accordance with this invention the separation of the meat from the appendages is accomplished, generally stated, in the following manner. The appendages are, after steaming or boiling, separated from the body and divided into suitable lengths; usually jointing or cutting at the joints is sufficient, although it is sometimes necessary or desirable to cut through the shell a little to one side of the joints. The appendage portions are then suitably assembled and directed to forces directed along the portions and of a sufficient magnitude to separate the meat from the shells. In order to accomplish this, the appendage portions are assembled on a rotatable support and positioned radially with respect to the center of rotation and the support is rotated at a high speed, 7,500 feet per minute or even higher. The appendage portions are, however, so retained as to leave the outer ends thereof substantially unobstructed so that the meat may pass freely from the shells and without tearing or shredding. This is accomplished by retaining the shells only and by engaging means coacting with the shells only.

In the accompanying drawings is shown apparatus for carrying out the method embodying this invention and embodying in itself features of this invention. It will, however, be understood that the apparatus is simply for illustration of a practical embodiment of this invention, since this invention is susceptible of various embodiments.

Referring to the accompanying drawing, and more particularly to Figures 1 and 2, the device, generally stated, consists of a rotatable pan embodying a spider having legs 1 connected to a hub 2 and having a rim 3. Mounted on the spider is a pan 4 having an outer wall 5. The center of this pan is open so as to provide an annular ledge 6 which is turned up at its inner edge in order to provide a shoulder 7. This pan may be secured to the spider in any suitable manner as by rivets 8. Cooperating with this pan is a cover 9 which has an outer wall 10 fitting over the wall 5 and which is supported by a spider consisting of arms 11, a hub 12 and a rim 13. The cover 9 is also riveted to the spider.

The hubs 2 and 12 are splined on an angular shaft 14 of a spindle 15 which is mounted for rotation in a casing 16 carrying suitable gearing and having a drive shaft 17 on which is mounted a pulley 18 whereby the spindle 15 may be driven at a high rate of speed from any suitable source of power. This casing 16 is adapted for mounting on any suitable support as 19, being clamped in position by a suitable clamp 20.

The pan 4 and the cover 9 are provided with retaining means consisting in the particular embodiment shown of sharp pins or fingers 21 and 22 which in this case are set into the rims 3 and 13 respectively, the lower pins 21 being preferably set at an angle as shown. The cover hub 12 is also preferably provided with a tubular extension 23 on which is mounted a handle 24 with anti-friction bearings 25 so that the handle 24 may be grasped while the pan and cover are rotated in unison.

Figure 4 shows a portion of a leg ready to have the meat separated therefrom, the shell being shown at 26 and the meat at 27. It will also be noted that the shell has ridges of saw-tooth form, one of them being shown at 28.

Figure 5 shows the method of placing the appendages in the apparatus such as shown in Figures 1 and 2. In order to accomplish this, the cover 9 is removed and the appendages placed radially on the ledge 6 with their open edges abutting against the retaining pins 22. The cover is now placed in position and it drops down until the cover engages the shell at which time the upper retaining pins 22 will engage the outer edge of the shells; in case, however, the shells should project beyond the pins, the pins will simply rest on the shells. However the weight of the pan will be applied to holding the shells in position, and this can be supplemented by grasping the handle 24 and pressing downwardly, the roller bearing connection between the handle and the cover permitting rotation. With the shells thus positioned the pan is rotated at a high rate of speed and since the shells are held against movement, the meat will be thrown therefrom by centrifugal force. The ends of the shells are, however, substantially unobstructed since the retaining pins 21 and 22 project only sufficiently to engage the shells, while permitting the meat to freely pass therethrough without any appreciable tearing, especially since the pins are sharp and, therefore, only slightly score the surface, if at all. The meat is, therefore, thrown into the compartment beyond the retaining pins and bounded by the walls 4 and 10. After the meat has been thrown from the shells, the cover is removed and at this time the pan itself can also be removed and placed on a suitable support. The shells can then be moved into the open center of the pan and over the shoulders 7 and can be discarded through this open center. The meat and the juices collected in the outer compartment can then be readily removed.

In the embodiment shown in Figures 3 and 6, the pan itself is constructed as heretofore described and is, therefore, referred to by similar reference characters. The cover 9, however, has mounted thereon a ring 29 to which are fastened a series of springs 30 having sharp retaining portions or pins 31 projecting through holes in the pan. It will be understood that there are a number of these springs with retaining pins or portions 31 arranged radially of the pan cover 9 and these retaining pins are preferably so arranged as to be slightly inside of the pins 21. The shells can now be placed as indicated in Figure 6 with either the ends of these shells abutting against the retaining pins 21 or with the shell surfaces resting thereon. By then bringing the cover down, the retaining pins 31 will engage the shells, and since they will ordinarily take behind saw-tooth portions, such as 28, they will firmly hold the shells in position. It will be seen moreover that the springs will give so that one or more pins may adapt themselves to a particular shell in order to firmly hold it in position. It will be understood moreover that the cover can be held either by its own weight or it may be provided with a handle such as 24 as shown in Figure 2. The operation is otherwise the same as previously described.

It will, therefore, be seen that the invention accomplishes its objects. A method and apparatus is provided whereby the meat may be rapidly and efficiently separated from the shell of the appendages without substantially any mutilation of the meat, so that the meat portions are extracted therefrom whole. The device is simple in construction as well as operation, is economical to manufacture, and can be operated by unskilled labor.

It is obvious that various changes may be made in details without departing from the spirit of this invention; it is, therefore, to be understood that this invention is not to be limited to the specific details shown and described.

Having thus described the invention, what is claimed is:

1. The method of removing the whole meat intact from the legs or claws of king or taraba crabs comprising dividing the appendages, assembling the appendage portions radially with respect to a center of rotation, and rotating the assembled portions about said center at a speed sufficient to separate the meat from the appendage shells, while the shell portions only are retained as to leave the shell openings unobstructed at the outer ends thereof.

2. An apparatus for shelling Crustacea comprising, a pan adapted and mounted for rotation at high speed, and means engaging the shells only adapted to retain the same on said pan in order to permit the meat to be thrown therefrom without obstruction.

3. An apparatus for shelling Crustacea comprising, a pan adapted and mounted for rotation at high speed and having a ledge on which the shells may be assembled radially thereon, and closely spaced means engaging the shells only adapted to retain the same on said ledge in order to cause the meat to be thrown therefrom into said pan.

4. An apparatus for shelling the legs and claws of Crustacea comprising, a pan adapted and mounted for rotation at high speed and having a base on which the appendages may be assembled radially, and closely spaced means engaging the shells only adapted to retain the same on said base in order to cause the meat to be thrown therefrom into the pan.

5. An apparatus for shelling the legs and claws of Crustacea comprising, a pan adapted and mounted for rotation at high speed and having a base on which the appendages may be assembled radially, and means adapted and positioned for engaging the shells only in order to cause the meat to be thrown therefrom.

6. An apparatus for shelling the legs and claws of Crustacea comprising, a pan adapted and mounted for rotation at high speed and having a base on which the appendages may be assembled radially, and adjustable means for gripping the shells at their outer portions adapted to hold the same while the meat is thrown therefrom into said pan.

7. An apparatus for shelling Crustacea comprising, a pan adapted and mounted for rotation at high speed and having a base on which the appendages may be assembled, a cover for said pan, and means on said cover adapted to engage and retain the shells.

8. An apparatus for shelling Crustacea comprising, a pan adapted and mounted for rotation at high speed and having a base on which the appendages may be assembled, a cover for said pan, and means on said pan and said cover adapted to engage and retain the shells.

9. An apparatus for shelling Crustacea, comprising, a pan adapted and mounted for rotation at a high speed, a series of claws arranged circumferentially within said pan, and a cover for said pan mounted to rotate therewith having a series of circumferentially arranged claws corresponding to said first claws and adapted to cooperate therewith to hold the Crustacea shells.

10. An apparatus for shelling Crustacea, comprising, a pan adapted and mounted for rotation at a high speed, a series of claws arranged circumferentially within said pan and spaced from the rim thereof, and a cover for said pan mounted to rotate therewith and having a series of circumferentially arranged claws corresponding to said first claws and adapted to cooperate therewith to hold the Crustacea shells.

11. An apparatus for shelling Crustacea, comprising, a pan adapted and mounted for rotation at a high speed, a series of claws arranged circumferentially within said pan, and a cover for said pan mounted to rotate therewith and having a series of circumferentially arranged claws corresponding to said first claws and adapted to cooperate therewith to hold the Crustacea shells, said cover being adjustable to hold shells of different sizes.

In testimony whereof I affix my signature this 5th day of November, 1924.

KARL D. UMRATH.